United States Patent [19]

Baker

[11] Patent Number: 5,613,895
[45] Date of Patent: Mar. 25, 1997

[54] PARTICULATE FLOW CONTROL SYSTEM

[75] Inventor: Raymond E. Baker, Porters Corners, N.Y.

[73] Assignee: The Guyson Corporation of U.S.A., Saratoga Springs, N.Y.

[21] Appl. No.: 341,053

[22] Filed: Nov. 16, 1994

[51] Int. Cl.⁶ .................................................. B24C 3/00
[52] U.S. Cl. .................. 451/2; 451/99; 451/102
[58] Field of Search .................. 451/2, 99, 102

[56] References Cited

U.S. PATENT DOCUMENTS

| | | | |
|---|---|---|---|
| 3,775,860 | 12/1973 | Barnes et al. | 34/1 |
| 4,423,623 | 1/1984 | Ho et al. | 73/61 |
| 4,614,100 | 9/1986 | Green et al. | 451/2 |
| 4,848,123 | 7/1989 | Thompson | 451/102 |
| 5,097,633 | 3/1992 | Branton et al. | 451/99 |
| 5,176,018 | 1/1993 | Thompson | 451/102 |
| 5,259,239 | 11/1993 | Gaisford | 73/61.44 |

*Primary Examiner*—James G. Smith
*Assistant Examiner*—Dona C. Edwards
*Attorney, Agent, or Firm*—Low and Low

[57] ABSTRACT

A simple and effective means is provided to control sand blast or like particulate media flow in the cleaning and scouring of workpieces to insure substantially uniform cleaning. To this end, microwave energy is directed at the particle flow, and energy reflection therefrom effects desired opening, closing, and intermediate control of sand blast flow means, as a valve interposed in the blast conduit.

3 Claims, 1 Drawing Sheet

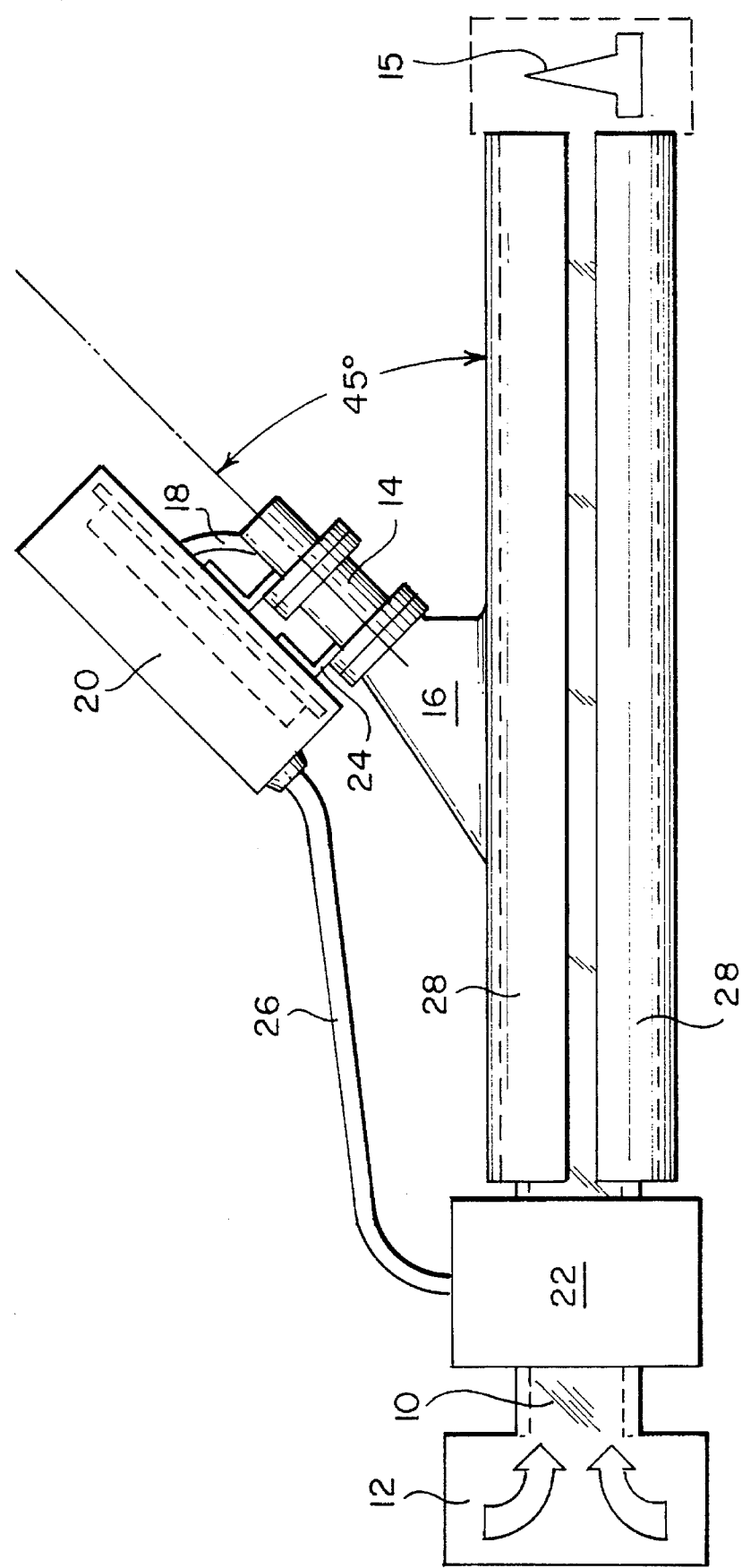

PARTICULATE FLOW CONTROL SYSTEM

BACKGROUND OF THE INVENTION

In conventional abrasive blast cleaning systems wherein a suitable blast media as particulate sand is forcibly directed from a nozzle under air pressure or by centrifugal force against and around a workpiece to scour and clean the same, it is highly desirable and indeed frequently necessary to insure that successive like workpieces, as molded metal parts, are subjected to the same amount and intensity of sand blast to insure generally uniform and like scouring on all like workpieces by the abrasive media. Heretofore, no simple yet effective means has been available in the marketplace.

SUMMARY OF THE INVENTION

The invention embraces the interposition into the sandblast flow line between the air blast sand source and the discharge therefrom to the workpiece of means for observing the quantity and intensity of the abrasive media flow and controlling the same so as to effect a substantially uniform blast flow, thereby providing like blast and scouring effects on successive workpieces. In this manner, substantially the same mass of abrasive material (e.g. sand) in a prescribed unit time can be delivered to successive workpieces, thereby to produce substantially identically cleaned parts.

The invention contemplates utilizing a source of microwave energy directed into the particulate flow, the reflected energy from which is a function of the quantity of blast media being delivered. The reflected energy develops a signal in conventional manner which is uses to control sand blast flow, as by a throttling valve.

BRIEF DESCRIPTION OF THE DRAWING

The single FIGURE diagrammatically illustrates a conventional sand blast flow line to which an energy source and detection reflector is attached, and which Controls sand blast flow to equalize treatment.

DESCRIPTION OF THE PREFERRED EMBODIMENT

Referring to the drawing, there is shown at 10 a conduit or flow line for blast particulate media, as sand, which is propelled from a conventional source (12) at the left of the flow line, and is conventionally discharged through a nozzle (not shown) against a workpiece (indicates at 15) from the flow line at its right hand end. The propelling force, as is well known, is often an air blast, but may also be from a centrifugal force impelling means. The workpiece in known manner may b supported upon a conveyor belt or indexing table, whereby the workpiece lies in the blast field for a predetermined time Such sand blast systems are long conventional in the art, and usually include means whereby an operator can manually start and stop the sand blast flow, or regulate the bead supply of the air pressure employed to convey the same into a usual sand blast housing employed to retain and recover the sand and prevent its undesirable and hazardous discharge into the atmosphere in the workplace.

In the instant invention, however, automatic means are provided whereby uniformity and regularity of flow are determined and maintained with minimal expense and upkeep. To this end, instead of the usual metal conduits or metal reinforced hose for the air blast particulate media, a fully non-metallic conduit 10 is provided through which the abrasive media travels from source to workpiece.

The conduit 10 is non-metallic to receive surmounted thereon and be readily energy-transparent to an energy source 14 in the nature of a microwave generator, which also includes a conventional detector or receiver for reflected energy. Microwave generator and detector 14 is mounted at an angle to the sand blast flow, and a conventional and suitably shaped generally frustoconical shield or horn 16 extends between the generator 14 and the conduit 10 to preclude unwanted stray of energy in the workplace. In like manner, the conduit 10 is preferably embraced by substantially semi-cylindrical shielding 28 to prevent unwanted stray radiation of the high microwave energy outwardly from the sand blast conduit. Suitable and conventional power means (not shown) is connected to the microwave generator-detector 14.

As seen in the Figure, the microwave generator-detector 14 is positioned at an angle, preferably 45°, to the conduit 10 directed rearwardly of particle flow. The microwave unit is positioned such that the axis of the microwave energy output lies in the same vertical plane as the axis of conduit 10, and in an angled path to intercept the flow of sand or particulate media flowing within 10 and about the axis of the conduit 10. Such microwave or radar-like energy sources and detectors are well known in the art and commercially available, and do not, per se, comprise the present invention.

As is well known, there will be an echo or reflection of energy from the media passing through the conduit back towards the microwave generator-detector 14. The amount of reflection is an amplitude function of the mass of the sand or like media, while the frequency of the reflected echo is a function of the speed or rate of flow of the sand or like particulate media passing towards the workpiece.

Conventional reflected energy detection means is provided as part of the device 14, which detector means is connected at 18 to control circuitry in housing 20. The housing 20 is preferable and conveniently mounted upon the microwave generator-receiver 14, illustratively as by brackets 24.

Interposed in the flow line 10 upstream of the microwave energy source 14 is a flow control 22. The same may conveniently comprise an adjustable valve which is movable to regulate sand blast flow therethrough. Flow control 22 is conventionally connected to the control circuitry as by electric connections 26. The operation and extent of flow control adjustment may be predetermined in known manner by settings of control circuitry at 20.

It is evident from the foregoing, then, that in use microwave energy is directed into the flow conduit 10, and the reflection therefrom is a function of the sand blast. The detected reflection is employed to regulate the amount of opening or closing of sand blast flow control 22, thereby ensuring that substantially uniform sand blasting occurs on like workpieces subjected to the otherwise conventional scouring treatment.

While disclosed in the context of blast flow control it is evident, that with modification, the control system herein may be employed in other feeding environments.

I claim:

1. A flow control system for blast cleaning equipment comprising, a flow conduit for blast media extending between a media source at its upstream end and a workpiece to be cleaned at its downstream end, said conduit being transparent to microwave energy, a microwave energy source and detector mounted on said conduit and angled toward said conduit so as to direct energy toward and through the conduit to impact upon blast media passing through said conduit, said microwave energy source and detector being mounted on said conduit at substantially a 45° angle toward the conduit in the direction of the media source, valve means disposed in said conduit upstream from said microwave energy source and detector, circuit means connected to said microwave energy source and detector for receiving and processing echo signals from said detector representative of the mass of media subjected to microwave energy, and, means connecting said valve means to said circuit means for controlling said valve in response to detected media flow, thereby to maintain a predetermined level of particulate media flow in said conduit.

2. The flow control system for blast cleaning equipment of claim 1 wherein substantially semi-cylindrical microwave energy shielding means is disposed about said conduit on both sides thereof in an axial direction along said conduit in the area of the intersection of microwave energy with said conduit.

3. The flow control system for blast cleaning equipment of claim 1 wherein said circuit means includes means for measuring the amplitude and frequency of the detected signal in controlling said valve means.

* * * * *